United States Patent
Burban et al.

(10) Patent No.: US 7,396,383 B2
(45) Date of Patent: Jul. 8, 2008

(54) MEMBRANE-BASED RESERVOIR DRYER

(76) Inventors: John H. Burban, 9612 57th St. North, Lake Elmo, MN (US) 55042; Michael R. Spearman, 2 Lacewing Pl., The Woodlands, TX (US) 77380; David S. Kolstad, 2721 Evergreen Cir., White Bear Lake, MN (US) 55110; Craig J. Cuta, 1159 Macy Way, Still Water, MN (US) 55082

( * ) Notice: Subject to any disclaimer, the term of this patent is extended or adjusted under 35 U.S.C. 154(b) by 0 days.

(21) Appl. No.: 11/257,256

(22) Filed: Oct. 24, 2005

(65) Prior Publication Data

US 2006/0086249 A1    Apr. 27, 2006

Related U.S. Application Data

(60) Provisional application No. 60/621,788, filed on Oct. 25, 2004.

(51) Int. Cl.
*B01D 53/22* (2006.01)

(52) U.S. Cl. ............ 95/52; 95/10; 95/12; 95/117; 95/273; 96/4; 96/8; 96/108; 96/417; 55/315; 55/385.4; 55/505; 55/512

(58) Field of Classification Search ......... 95/8, 95/10, 12, 24, 45, 52, 90, 117, 273, 118; 96/4, 8, 11, 108, 111, 417, 184; 55/315, 55/385.1, 385.4, 505, 512, DIG. 17; 220/694, 220/720, 86.1; 244/135 R; 137/565.19
See application file for complete search history.

(56) References Cited

U.S. PATENT DOCUMENTS

| | | | | |
|---|---|---|---|---|
| 2,976,950 A | * | 3/1961 | Smith | 55/385.4 |
| 3,452,519 A | * | 7/1969 | Bianchetta | 55/385.4 |
| 3,821,876 A | * | 7/1974 | Glaspell | 220/720 |
| 4,504,289 A | | 3/1985 | Waller | 55/316 |
| 4,548,624 A | | 10/1985 | Waller | 55/274 |
| 5,494,102 A | * | 2/1996 | Schulte | 417/264 |
| 6,128,825 A | * | 10/2000 | Cunkelman | 95/52 |
| 6,217,639 B1 | | 4/2001 | Jackson | 96/134 |
| 6,585,192 B2 | * | 7/2003 | Beers | 55/385.4 |
| 6,585,808 B2 | | 7/2003 | Burban et al. | 96/8 |
| 6,840,982 B2 | * | 1/2005 | Kunstadt et al. | 55/385.4 |

* cited by examiner

*Primary Examiner*—Jason M Greene
(74) *Attorney, Agent, or Firm*—Jacobson and Johnson; Thomas N. Phung

(57) ABSTRACT

A device and method for preventing ingression of contaminants and moisture and for removing moisture from a fluid reservoir, the device comprising a fluid reservoir for supporting a fluid therein, a fluid reservoir opening for allowing an exchanging of air between an interior of the fluid reservoir and the ambient surrounding, and a membrane-based reservoir dryer located in fluid communication with the fluid reservoir, the membrane-based reservoir dryer comprising a source of compressed gas and a membrane dryer for drying the compressed gas to increase the capacity of the compressed gas for absorbing moisture from the fluid in the reservoir.

21 Claims, 4 Drawing Sheets

MEMBRANE-BASED RESERVOIR DRYER

CROSS REFERENCE TO RELATED APPLICATIONS

This application claims priority to currently pending U.S. Provisional Application Ser. No. 60/621,788, which was filed on Oct. 25, 2004.

STATEMENT REGARDING FEDERALLY SPONSORED RESEARCH OR DEVELOPMENT

None

REFERENCE TO A MICROFICHE APPENDIX

None

FIELD OF THE INVENTION

This invention relates to lubricating and hydraulic systems, and more specifically to a method and device for preventing ingression of contaminants and moisture and for removing moisture from a fluid reservoir of lubricating and hydraulic systems.

BACKGROUND OF THE INVENTION

Lubricating and hydraulic fluids are used extensively throughout manufacturing plants and in industrial machinery. In most of these applications, the fluid is contained in a reservoir and is delivered to the desired locations by either the action of a pump or by splash-lubrication. When the fluid is pumped to the desired location, atmospheric air is drawn into the reservoir to take up the volume of the pumped out oil and thus prevent any amount of vacuum in the reservoir, as the typical reservoir is not designed for vacuum service. Additionally in equipment that may not run continuously, atmospheric air may be drawn into a reservoir due to volume changes upon cooling. This exchange of air between the reservoir and the ambient surroundings is known in the art as reservoir breathing.

For all lubricating and hydraulic systems, the need to keep the oil clean and dry is of paramount importance as equipment failure is directly linked to the presence of contaminants including particulates and water. Not only is liquid filtration commonly utilized to remove particulates from the fluid, but also measures are taken to prevent ingression of contaminants into the reservoir. One significant ingression point for contamination is through the reservoir openings that allow the reservoir to breathe. When a reservoir breathes in ambient air, contamination in the form of airborne particulates and moisture can be drawn in as well. Various methods have been used to minimize the ingression of contaminants into reservoirs.

The simplest approach used in the art is a turn down pipe 11, as shown in the reservoir 10 FIG. 1. The turn down pipe 11 basically prevents the gross ingression of liquid water when the reservoir 10 gets wet with water either from a rainstorm in exterior applications, or a washdown in interior applications. A limitation in using the turn down pipe 11 is that the turn down pipe 11 does not prevent the ingression of particulates or atmospheric moisture.

Another approach used in the art is a filter breather 13 shown in FIG. 2, where a filter media 15 is placed within a breather 14 to capture airborne particulates. Filter media 15 used in this type of filter varies widely from coarse open celled foam to fibrous filter media rated at 3-micron filtration. This approach is generally limited by pressure drop and efficiency of the filter and does nothing to prevent atmospheric moisture from entering the reservoir 12. Additionally, in order for all the air entering the reservoir 12 to get filtered, the reservoir 12 must be completely sealed except for the breathers. Otherwise as the filter element increases in pressure drop due to the accumulation of particulates, the likelihood of particulate laden air entering the reservoir through any gaps in the sealing surfaces increases significantly.

Desiccant breathers are also another type of technology used to address the issue of ingression of contaminants, as described in U.S. Pat. Nos. 4,504,289, 4,548,624, and 6,217,639 and illustrated in FIG. 3. The desiccant breather 17 of FIG. 3 is shown as comprising a desiccant material 20 to absorb moisture and a filter media 19 to remove particulate. Desiccant breathers however are limited in that they have only a finite capacity for moisture removal and thus when the desiccant is spent, do not remove any additional moisture. Users thus are required to closely monitor the conditions of the desiccant and change-out the breathers on a frequent basis.

The requirement to monitor and replace desiccant breathers adds to the overall cost of preventing ingression of contaminants into the reservoir 16. Additionally, desiccant breathers, such as desiccant breather 17, remove moisture only when the moisture is in close proximity of the desiccant material. Thus for a desiccant to remove moisture from the fluid 21 that is contained in the reservoir 16, the moisture must diffuse from the fluid surface to the desiccant material 17. As these distances are often on the order of 1 to 10 feet, the process is very slow and essentially passive.

All of the current technologies used to prevent the ingression of contaminants suffer from drawbacks resulting in less than optimal reservoir headspace condition. It is the object of the current invention to provide a means for preventing the ingression of particulate and moisture into reservoirs and to provide a means for the active removal of water and moisture from the fluid contained in the reservoir.

BRIEF SUMMARY OF THE INVENTION

A method and device for preventing ingression of contaminants and moisture and for removing moisture from a fluid supported in a fluid reservoir. The device includes a fluid reservoir opening for allowing an exchanging of air between an interior of the fluid reservoir and the ambient surrounding air and a membrane-based reservoir dryer located in fluid communication with the fluid reservoir in one embodiment. The membrane-based reservoir dryer comprises a source of compressed gas, a filter and a coalescer for removing particulates and aerosol contaminants from the compressed gas, a membrane dryer for drying the compressed gas to increase the compressed gas's capacity for absorbing moisture from the fluid in the reservoir, and a means for controlling the flow of gas out of the membrane-based reservoir dryer.

DESCRIPTION OF THE PRIOR ART

U.S. Pat. No. 4,504,289 teaches a breather cap for use on a liquid petroleum tank;

U.S. Pat. No. 4,504,289 teaches also a breather cap for use on a liquid petroleum tank;

U.S. Pat. No. 6,217,639 teaches a contamination control breather for use in conjunction with air inflow and outflow to and from machinery; and U.S. Pat. No. 6,585,808 teaches a membrane module for use in the removal of water from compressed gas streams and a method of making the apparatus.

DESCRIPTION OF THE PREFERRED EMBODIMENT

Figure 1:
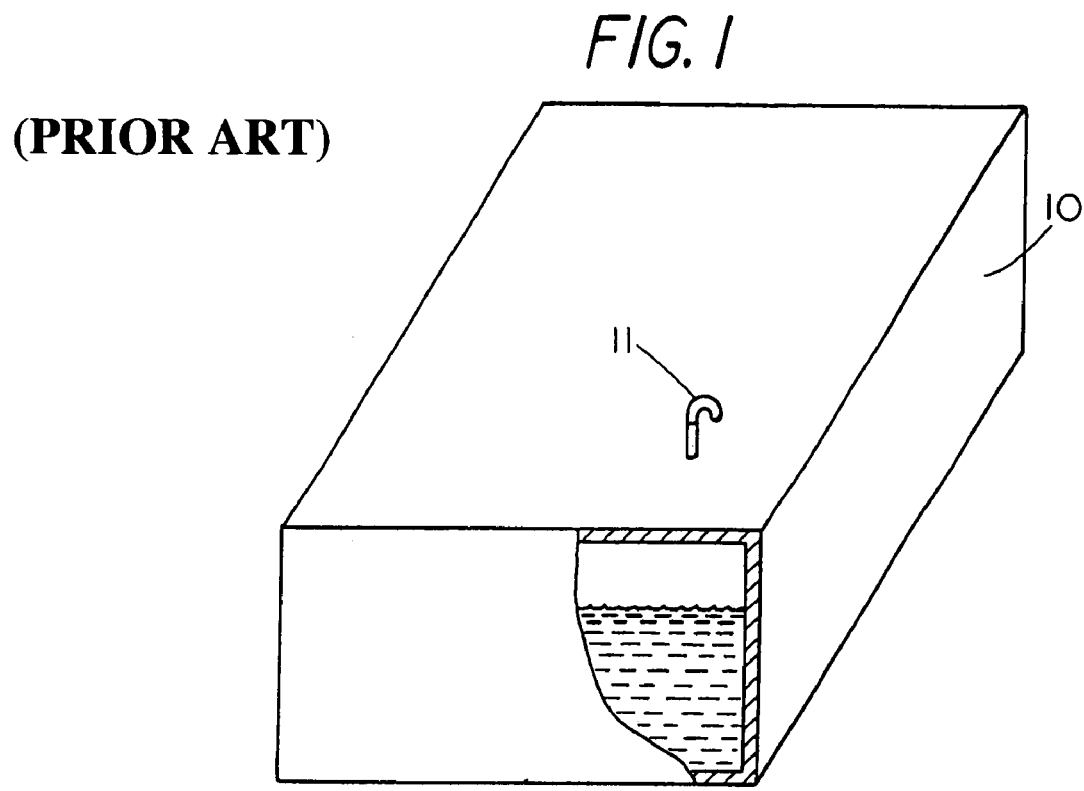
FIG. 1 shows a cut-a-way view of a fluid reservoir having a turn down pipe for preventing the gross ingression of liquid water therein.
Figure 2:
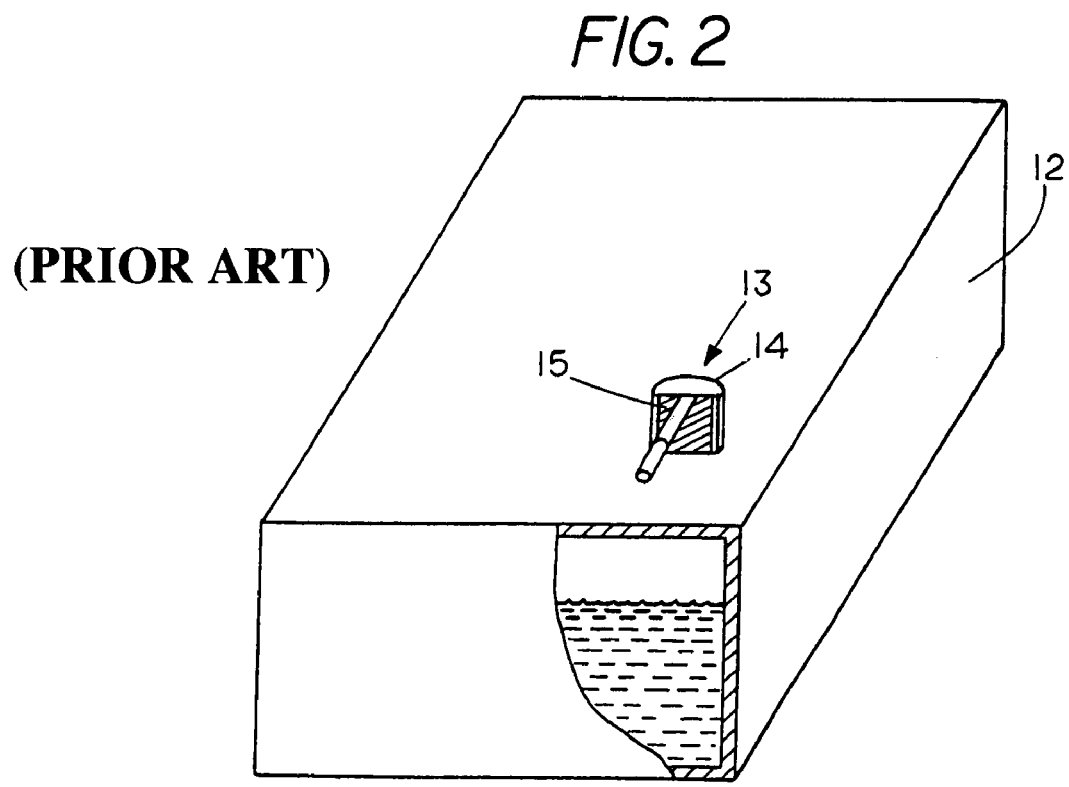
FIG. 2 shows a cut-a-way view of a fluid reservoir having a filter breather for capturing airborne particulates to prevent the airborne particulates from entering into the fluid reservoir.
Figure 3:
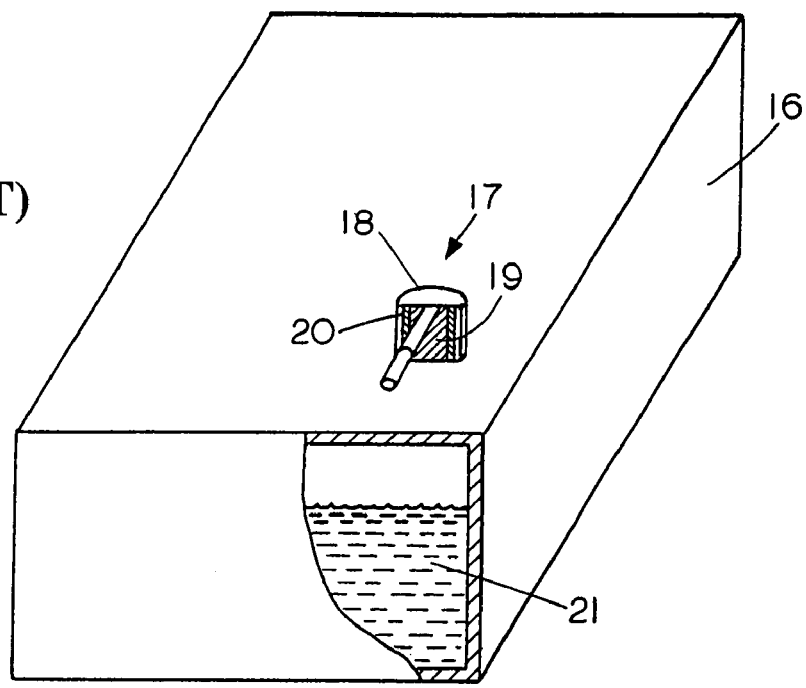
FIG. 3 shows a cut-a-way view of a fluid reservoir having a desiccant breather to absorb moisture and a filter media to remove particulates.
Figure 4:
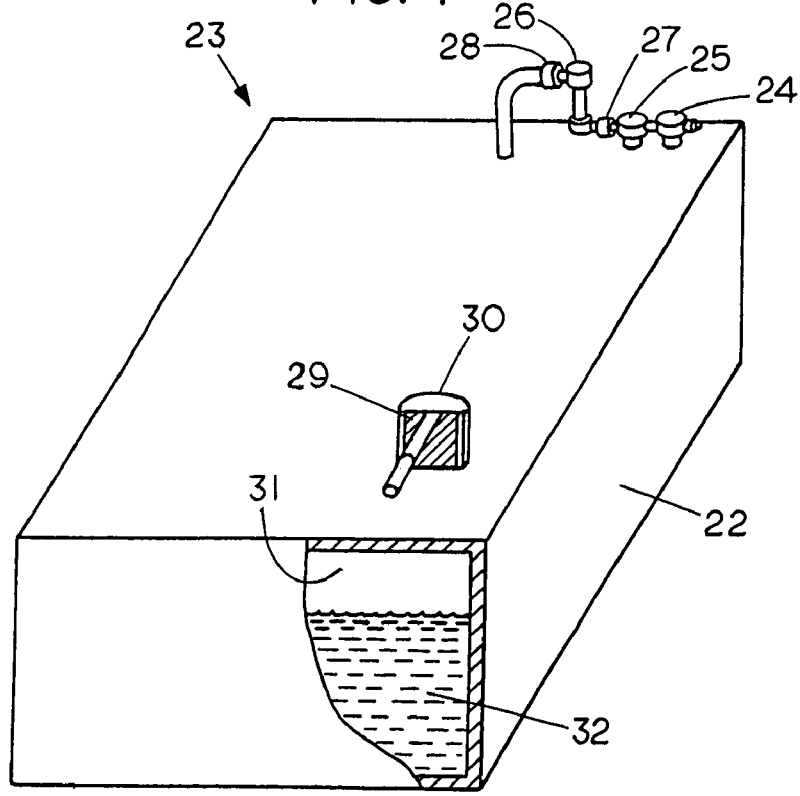
FIG. 4 shows a cut-a-way view of an embodiment of the present invention comprising a fluid reservoir having a membrane-based reservoir dryer.

Referring to FIG. 4, in accordance with the present invention, FIG. 4 shows a fluid reservoir 22 having a membrane-based reservoir dryer 23, which has the dual function of not only preventing the ingression of particulate and moisture into the fluid reservoir 22 but also removing moisture from a fluid 32 contained in the fluid reservoir 22.

In regards to the membrane-based reservoir dryer 23, as shown in FIG. 4 the membrane-based reservoir dryer 23 comprises a source of compressed air or gas (not shown), a filter 24 and coalescer 25, a membrane air dryer 26, and an apparatus for controlling or metering the amount of flow out of the membrane air dryer, such as an orifice or a metering valve 27. As further shown in FIG. 4, the membrane-based reservoir dryer 23 can also include a relief valve 28 for protecting against over pressurization of the reservoir 22. The membrane-based reservoir dryer 23 can also include a particulate filter 29 located on the exit point of the reservoir 22 to provide further protection against the ingression of particulate. The embodiment of FIG. 4 shows the exit point of the reservoir 22 as comprising a breather 30.

Referring to the filter 24 and coalescer 25, the filter 24 and coalescer 25 of the membrane-based reservoir dryer 23 functions to remove particulates and aerosol contaminants from a compressed gas stream. The aerosol present in the compressed gas stream may be either a compressor lubricant or water droplets formed from condensation of the water saturated gas stream. The filter 24 and coalescer 25 preferably remove particles down below 1 micron in size.

In regards to the membrane dryer 26, the membrane dryer 26 functions to dry the compressed gas sufficiently so that it has greater capacity for absorbing moisture from the fluid 32 in the reservoir 22. One of the many suitable membrane dryers is described in U.S. Pat. No. 6,585,808. After the gas is dried, a metered amount of the gas is then injected into the reservoir 22. The metering device may be a valve, orifice or any other means to control the desired amount of dry gas flow into the reservoir. The injection point for the dry gas is preferably located distal to the exit point for the gas and more preferably at one end of a reservoir 22 with the exit point for the gas located at the other end of the reservoir 22, although other locations are suitable as well.

The dry gas flows through a headspace 31 of the reservoir 22 maintaining a slight positive pressure relative to the ambient pressure of the environment surrounding the reservoir 22. In this manner, contaminants in the form of particulate and ambient moisture cannot enter the reservoir 22 through the breather 30 because the contaminants would have to travel against a pressure gradient. In addition, as the dry gas flows across the surface of the fluid 32, moisture will be removed from the fluid 32 in the reservoir 22, provided the relative humidity of the dry gas is below the relative water saturation of the fluid 32. Additionally the dry gas can be injected into the return pipe (not shown) that brings the fluid 32 back from the equipment to the reservoir 22 or the dry gas can be injected below the fluid surface, allowing for the gas to bubble up through the fluid 32 aiding in the stripping of moisture or other contaminants from the fluid 32.

Figure 5:
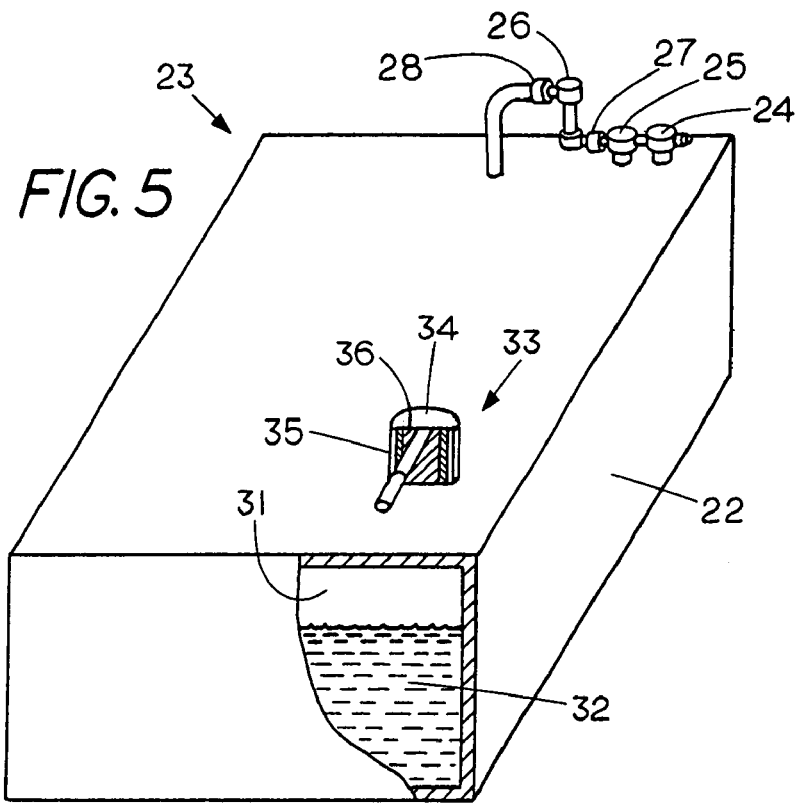
FIG. 5 shows a cut-a-way view of a fluid reservoir having a membrane-based reservoir dryer in combination with a desiccant breather.

Referring to FIG. 5, FIG. 5 shows an alternative embodiment of the present invention comprising fluid reservoir 22 having membrane-based reservoir dryer 23 in combination with a desiccant breather 33. Desiccant breather 33 is shown in FIG. 5 as comprising a breather for allowing an exchanging of air between an interior of the fluid reservoir 22 and the ambient surrounding, a desiccant media 35 for removing moisture from the air and a filter 36 for removing particulates from the air.

In the embodiment of FIG. 5 the membrane-based reservoir dryer 23 is used to blanket the headspace 31 of the reservoir 22 with a dry gas and the gas that exits the reservoir 22 passes through the desiccant breather 33. This aspect of the invention applies to reservoirs on equipments that are used intermittently, such as mobile equipment or plant equipment that shuts down every day. In the general applications of the aforementioned equipments, the compressed gas may only be available to the membrane-based reservoir dryer 23 when the equipment is operational. Thus the membrane-based reservoir dryer 23 will only be protecting the reservoir 22 when the equipment is operational.

In order to prevent ingression of contaminants from the atmosphere when the membrane-based reservoir dryer 23 is not in operation, the reservoir breather 33 is fitted with the desiccant media 34. In this way, any atmospheric air that is drawn into the reservoir will pass through the desiccant media 35 which will remove the moisture from the air and the filter, which will remove the particulates from the air. Traditionally a desiccant breather has a finite life when it has adsorbed all the moisture that the desiccant media can hold, but in the present invention the desiccant media 35 will be regenerated when the equipment and membrane-based reservoir dryer 23 is operational again because dry gas from the membrane-based reservoir dryer 23 will pass through the desiccant media as it is exhausted to the atmosphere, striping away any adsorbed moisture, thus overcoming the need for frequent replacement of the desiccant breathers 33

Another application of the membrane-based reservoir dryer 23 in combination with a desiccant breather 33 of FIG. 5 is for reservoirs that experience a cyclic variation of the fluid level, such as but not limited to hydraulic reservoirs that are part of a system that includes hydraulic rams. In these systems a large volume of fluid may be rapidly pumped into the ram thus lowering the fluid volume in the reservoir as work is being done by the hydraulic ram. Fluid then returns to the reservoir when the hydraulic ram is allowed to retract.

It is noted in the above system, if the volumetric gas flow rate being injected into the reservoir 22 from the membrane-based reservoir dryer 23 is less than the volumetric flow rate of fluid pumped out of the reservoir 22 then the additional ambient air that must make up the difference in volume will be drawn in through the desiccant breather 33. The desiccant breather 33 will remove the particulates and moisture from the ambient air as it is being drawn into the reservoir 22. The desiccant breather 33 will be regenerated when the fluid 32 returns to the reservoir 22, expelling the gas above the fluid 32, in combination with the dry gas injected into the reservoir 22 by the membrane-based reservoir dryer 23.

Figure 6:
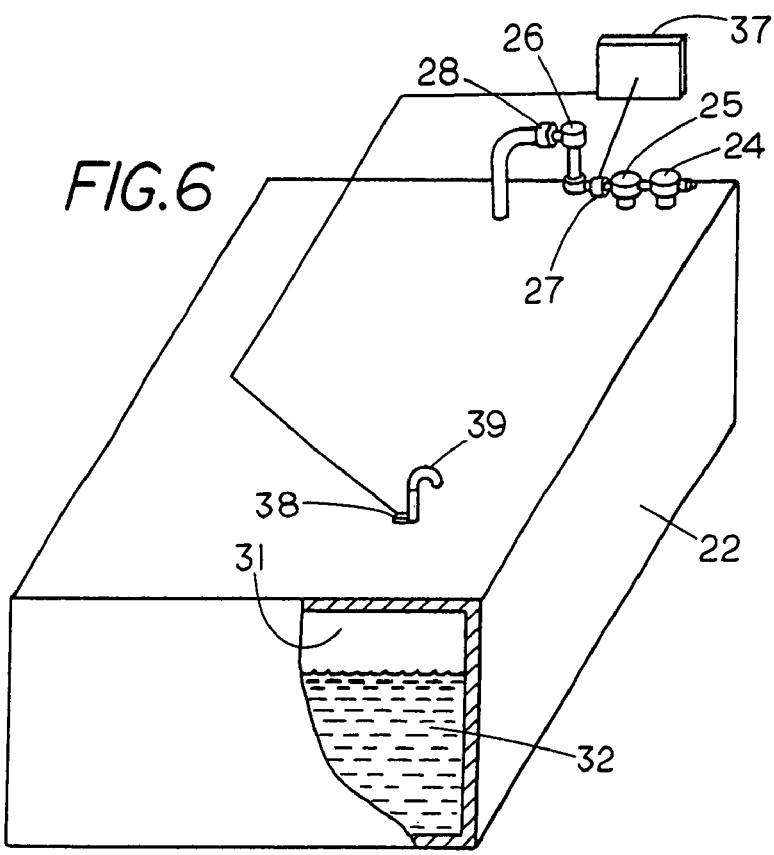
FIG. 6 shows a cut-a-way view of a fluid reservoir having a membrane-based reservoir dryer in combination with a control circuit.

Referring to FIG. 6, FIG. 6 shows an alternative embodiment of the present invention comprising the fluid reservoir 22 having the membrane-based reservoir dryer 23 in combination with a control device 37. In the embodiment of FIG. 6 the membrane-based reservoir dryer 23 is used to blanket the headspace 31 of a reservoir 22 with a dry gas and a sensor 38 is placed at the point in the reservoir where the gas leaves the reservoir headspace. In the embodiment of FIG. 6, the point in the reservoir where the gas leaves the reservoir headspace is shown as comprising turndown pipe 39. The sensor 38 functions to measure the relative humidity of the gas and feeds back a signal to controlling device of the control circuit 37. At equilibrium, the relative humidity of moisture in the fluid 32 in the reservoir 22 will be equal to the relative humidity of moisture in the reservoir headspace 31. Thus by monitoring the relative humidity of the gas in the headspace 31, the condition of the fluid 32 can be inferred.

In regards to the control device 37 of the embodiment of, control device 37 functions to automatically adjust the amount of dry gas that is being injected into the reservoir 22 to maintain the desired target level of moisture in the headspace 31 and the amount of moisture in the fluid 32. In this manner, the process of blanketing the reservoir 22 will automatically respond to changes in the ingression rate of moisture. That is, if a process upset occurs whereby additional water enters the fluid 32 contained in the reservoir 22, the moisture content of the gas exiting the reservoir will increase. It is noted that if the system does not automatically respond with an increase in dry gas flow rate, the amount of gas injected into the reservoir 22 would be limiting and the time required to recover from the upset could be unacceptably long.

Additionally, as the reservoir fluid 32 "dries out," the relative humidity of the dry gas exiting the reservoir 22 will be lower, thus signaling the controlling device 37 to reduce the amount of dry gas injected into the reservoir 22. Alternatively, the sensor 38 may be placed in the fluid, directly measuring the moisture content of the fluid 32 and providing a signal to the control device 37 to automatically adjust the gas injection rate based on the fluid condition.

Figure 7:
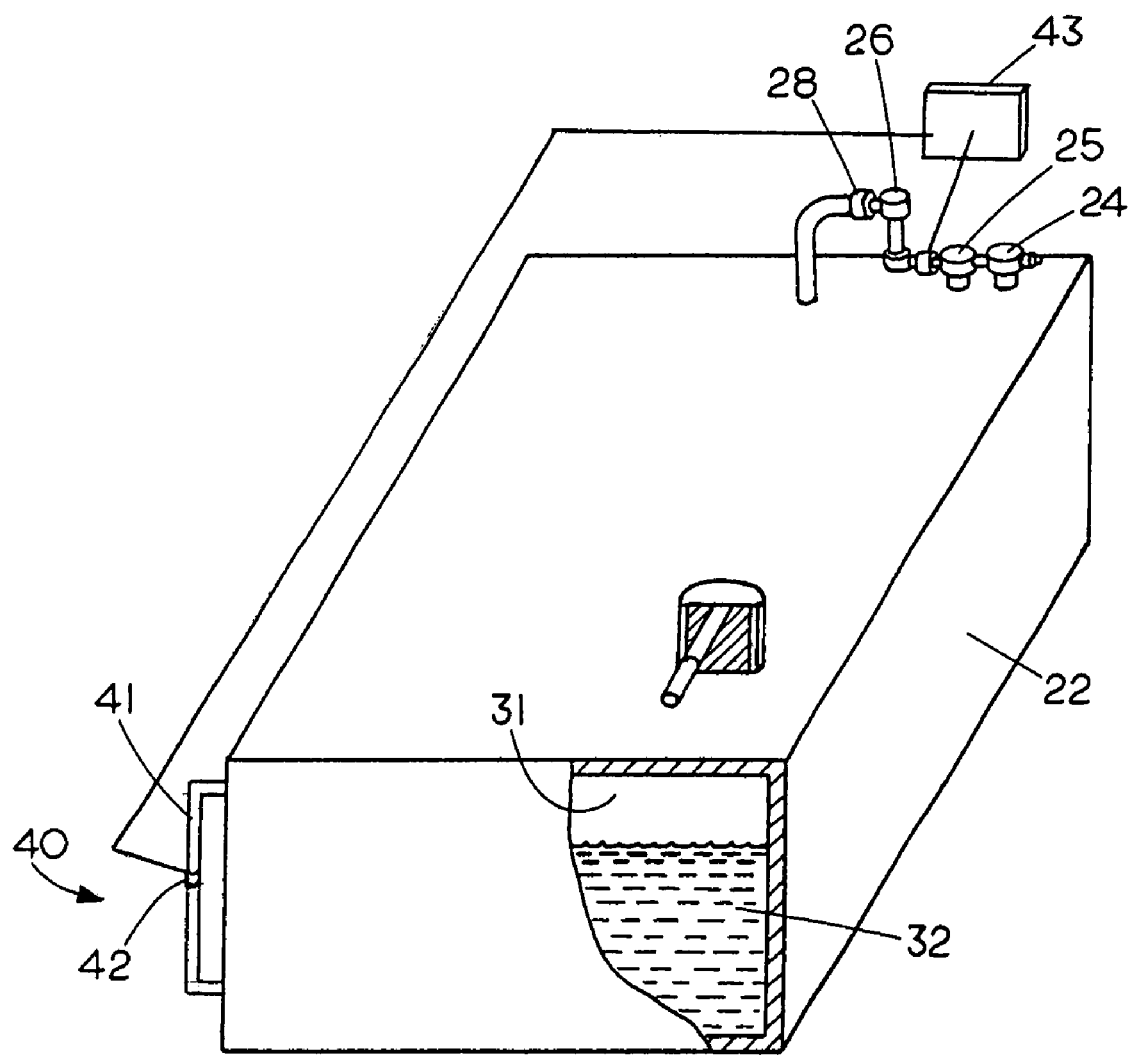
FIG. 7 shows a cut-a-way view of a fluid reservoir having a membrane-based reservoir dryer in combination with a fluid level sensing means.

Finally, referring to FIG. 7, FIG. 7 shows an alternative embodiment of the present invention comprising fluid reservoir 22 and membrane-based reservoir dryer 23 in combination with a fluid level sensing means 40. In the embodiment of FIG. 7 the membrane-based reservoir dryer 23, again, is used to blanket the headspace 31 of a reservoir with a dry gas. In order to insure continuous conditioning of the reservoir headspace 31 without using excessive quantities of dry gas being injected into the reservoir 22, the fluid level sensing means 40 is incorporated into the system. In view of the aforementioned, when the fluid level drops, such as when a hydraulic ram is filled or fluid 32 is transferred from one reservoir to another, the volumetric amount of dry gas injected into the reservoir 22 is automatically increased to insure that ambient air is not drawn into the reservoir 22. Additionally, when fluid returns to the reservoir 22 and the fluid level increases, the volumetric amount of dry gas injected into the reservoir 22 is decreased to minimize the consumption of dry gas.

In the above embodiment fluid sensing means 40 can be but is not limited to any device that determines the fluid level in the reservoir 22, or it can be any device that determines the fluid flow rate in the system piping. For example, the fluid level sensing means 40 can a sight tube 41, a level sensor 42, and a control device 43 with the level sensor 42 a portion of the sight tube 41 and functioning to send signals to the control device 43 regarding the level of the fluid 32 in the fluid reservoir 22. It is also noted that the fluid level sensor 40 can also be correlated to the action of a pump or a valve or the differential pressure between the reservoir headspace and the ambient environment.

In further regards to the present invention, it is noted that a combination of any of the above featured of the invention can be provided. For example, a membrane-based reservoir dryer 23 with a controller can be used in combination with a desiccant breather.

The present invention also includes a method of preventing ingression of contaminants and moisture and removing moisture from a fluid reservoir 22 comprising the steps of: (1) directing a volume of compressed gas from a source of compressed gas through a filter 24 and coalescer 25 to remove particulates and aerosol contaminants from the compressed gas; (2) moving the compressed gas through a membrane dryer 26 to dry and increase the compressed gas's capacity for absorbing moisture; (3) injecting a metered amount of the dry gas into a fluid reservoir; (4) allowing the dry gas to flow through a headspace of the fluid reservoir 22 to remove moisture from the fluid in the fluid reservoir; and (5) maintaining a slight positive pressure relative to an ambient pressure of the environment surrounding the fluid reservoir 22 to prevent contaminants and ambient moisture from entering the fluid reservoir 22 through a reservoir breather.

The above method can further include the steps of (6) fitting a reservoir breather with a desiccant breather to remove moisture and particulates from the air atmospheric air that is drawn into the reservoir when the membrane-based reservoir dryer 23 is not in operation; (7) directing dry gas through the desiccant breather to remove moisture absorbed by the desiccant breather thereby extending the life of the desiccant breather; (8) measuring a relative humidity of the gas in the fluid reservoir 22 and sending information regarding the relative humidity of the gas in the fluid reservoir 22 to a controlling device; (9) automatically adjusting the amount of dry gas that is being injected into the fluid reservoir 22 to maintain a desired target level of moisture in a headspace of the fluid reservoir 22 and the amount of moisture in the fluid; and (10) placing a sensor in the fluid of the fluid reservoir 22 to directly measure the moisture content of the fluid and providing a signal to a controlling means to automatically adjust the gas injection rate based on the fluid condition.

We claim:

1. A device for preventing ingression of contaminants and moisture and for removing moisture from a fluid comprising:
   a fluid reservoir for supporting a fluid therein;
   a fluid reservoir opening for allowing an exchanging of gas between an interior of the fluid reservoir and an exterior of the fluid reservoir; and
   a membrane-based reservoir dryer located in fluid communication with the fluid reservoir, the membrane-based reservoir dryer comprising a source of compressed gas and a membrane gas dryer for drying the compressed gas to increase the capacity of the compressed gas for absorbing moisture from the fluid-in the reservoir.

2. The device of claim 1 including a filter for removing particulates and aerosol contaminants from the compressed gas.

3. The device of claim 1 including a coalescer for removing particulates and aerosol contaminants from the compressed gas.

4. The device of claim 1 including a filter and a coalescer for removing particulates and aerosol contaminants from the compressed gas.

5. The device of claim 1 including a means for controlling the flow of gas out of the membrane-based reservoir dryer.

6. The device of claim 1 including a relief valve to protect against over pressurization of the fluid reservoir.

7. The device of claim 1 including a particulate filter located at an exit point on the fluid reservoir.

8. The device of claim 1 including a metering device for controlling a desired amount of dry gas flowing into the fluid reservoir.

9. The device of claim 1 wherein the fluid reservoir opening comprises a turndown pipe.

10. The device of claim 1 wherein the fluid reservoir opening comprises a breather having a filter for removing particulates from the ambient air drawn into the fluid reservoir.

11. The device of claim 10 wherein the breather includes a desiccant for removing moisture from the ambient air drawn into the fluid reservoir.

12. The device of claim 1 including a desiccant breather supported by the fluid reservoir opening, the desiccant breather removing moisture from the ambient air drawn into the fluid reservoir.

13. The device of claim 1 including a control circuit comprising a controlling device for maintaining a desired target moisture level in the fluid contained in the reservoir and a sensor located within the fluid reservoir measuring the moisture content of the fluid or of a headspace above the fluid and communicating the aforementioned to the controlling device.

14. The device of claim 1 including a control circuit comprising a controlling device for maintaining a desired target moisture level in a headspace of the fluid reservoir and a sensor located within the fluid reservoir for measuring the moisture content of the gas and communicating the aforementioned to the controlling device.

15. The device of claim 1 including a fluid level sensing device for controlling the amount of dry gas injected into the fluid reservoir to insure continuous conditioning of a fluid reservoir headspace without the injection of excessive quantities of dry gas into the fluid reservoir.

16. The device of claim 1 wherein the fluid reservoir opening is located distal to a dry gas injection point of the membrane-based reservoir dryer.

17. A device for preventing ingression of contaminants and moisture and for removing moisture from a fluid comprising:
a fluid, reservoir for supporting a fluid therein;
a fluid reservoir opening for allowing an exchanging of gas between an interior of the fluid reservoir and the ambient surrounding; and
a membrane-based reservoir dryer located in fluid communication with the fluid reservoir and distal to the fluid reservoir opening, the membrane-based reservoir dryer comprising a source of compressed gas, a filter and a coalescer for removing particulates and aerosol contaminants from the compressed gas, and a membrane dryer for drying the compressed gas to increase the capacity of the compressed gas for absorbing moisture from the fluid in the reservoir, and a metering device for controlling a desired volume of dry gas flowing into the fluid reservoir.

18. The device of claim 17 including a relief valve to protect against over pressurization of the fluid reservoir.

19. The device of claim 17 wherein the fluid reservoir opening comprises a breather having a filter for removing particulates from the gas drawn into the fluid reservoir.

20. The device of claim 19 wherein the breather includes a desiccant for removing moisture from the gas drawn into the fluid reservoir.

21. A method of preventing ingression of contaminants and moisture and removing moisture from a fluid reservoir comprising the steps of:
directing a volume of compressed gas from a source of compressed gas through a filter and coalescer to remove particulates and aerosol contaminants from the compressed gas;
moving the compressed gas through a membrane dryer to dry and increase the capacity of the compressed gas for absorbing moisture;
injecting a metered amount of the dry gas into a fluid reservoir;
allowing the dry gas to flow through a headspace of the fluid reservoir to remove moisture from the reservoir headspace and from the fluid in the fluid reservoir; and maintaining a slight positive pressure relative to an ambient pressure of the environment surrounding the fluid reservoir to prevent contaminants and ambient moisture from entering the reservoir headspace and from the fluid reservoir through a reservoir breather.

* * * * *